United States Patent
Nakai et al.

(10) Patent No.: US 8,190,347 B2
(45) Date of Patent: May 29, 2012

(54) METHOD AND APPARATUS FOR CONTROLLING ANTEROPOSTERIOR ACCELERATION OF A VEHICLE

(75) Inventors: Yasuhiro Nakai, Kariya (JP); Shotaro Fukuda, Oobu (JP); Satoshi Niwa, Nagoya (JP); Hajime Kumabe, Kariya (JP); Shintaro Osaki, Nisshin (JP); Kazunori Kadowaki, Nagoya (JP)

(73) Assignees: DENSO CORPORATION, Kariya (JP); Advics Co., Ltd., Aichi-pref (JP)

( * ) Notice: Subject to any disclaimer, the term of this patent is extended or adjusted under 35 U.S.C. 154(b) by 739 days.

(21) Appl. No.: 12/222,388

(22) Filed: Aug. 7, 2008

(65) Prior Publication Data

US 2009/0043466 A1 Feb. 12, 2009

(30) Foreign Application Priority Data

Aug. 10, 2007 (JP) ................. 2007-209243

(51) Int. Cl.
*B60T 8/58* (2006.01)
(52) U.S. Cl. .......................................... 701/96
(58) Field of Classification Search ............ 701/96
See application file for complete search history.

(56) References Cited

U.S. PATENT DOCUMENTS

| | | | | |
|---|---|---|---|---|
| 3,668,878 A * | 6/1972 | Jones et al. | ................ | 405/167 |
| 3,967,862 A * | 7/1976 | Hunter et al. | ................ | 303/150 |
| 5,313,395 A * | 5/1994 | Kawai et al. | ................ | 701/110 |
| 5,317,937 A * | 6/1994 | Yoshizawa et al. | ............ | 477/120 |
| 5,331,934 A * | 7/1994 | Asama et al. | ................ | 477/111 |
| 6,098,007 A | 8/2000 | Fritz | | |
| 6,161,073 A * | 12/2000 | Tange et al. | ................ | 701/96 |
| 7,353,814 B2 | 4/2008 | Hirowatari et al. | | |
| 2002/0193204 A1 | 12/2002 | Klosel et al. | | |
| 2004/0158385 A1* | 8/2004 | Nakano et al. | ................ | 701/104 |
| 2005/0072139 A1* | 4/2005 | Kato | ................ | 60/285 |

FOREIGN PATENT DOCUMENTS

DE 196 32 337 A1 2/1998

(Continued)

OTHER PUBLICATIONS

David B. Leach. Introduction Beyond Single Loop PID Control: Model-Based and Combined Feedforward-Feedback Control. Mar. 19, 2003 © 2003 Industrial Process Optimization. Downloaded on May 5, 2011.*

(Continued)

*Primary Examiner* — Mark Hellner
*Assistant Examiner* — Ari M Diacou
(74) *Attorney, Agent, or Firm* — Posz Law Group, PLC

(57) ABSTRACT

A control apparatus controlling anteroposterior acceleration of a vehicle by controlling a motive power generation apparatus mounted on the vehicle, which is also provided with a staged transmission apparatus that operates on gear ratios. The motive power generation apparatus has an output shaft producing a rotation force in response to a command to be requested. The rotation force is transmitted to the drive wheels via the staged transmission apparatus. A feedback manipulated variable is calculated to control the production of the rotation force of the motive power generation apparatus so that an actual value of anteroposterior acceleration of the vehicle is controlled at a target value thereof. The calculated feedback manipulated variable is used as the command. When the staged transmission apparatus is in the switchover control of the gear ratios, the manipulated variable is is limited from being calculated (for example, stopped from being calculated).

16 Claims, 9 Drawing Sheets

FOREIGN PATENT DOCUMENTS

| | | |
|---|---|---|
| DE | 101 28 878 A1 | 12/2002 |
| JP | A-H7-304349 | 11/1995 |
| JP | A-H8-040231 | 2/1996 |
| JP | A-2003-172181 | 6/2003 |
| JP | A-2006-506270 | 2/2006 |
| JP | A-2006-170098 | 6/2006 |

OTHER PUBLICATIONS

Office Action mailed on Feb. 23, 2010 issued from the German Patent Office in the corresponding German patent application No. 10 2008 037 016.9-14 (with English translation).

Office Action mailed Nov. 8, 2011 in corresponding JP Application No. 2007-209243 (and English translation).

* cited by examiner

RESPONSE CHARACTERISTIC OF ACTUAL VEHICLE

Twpt: REQUESTED POWER TRAIN TORQUE
Twbk: REQUESTED BRAKE TORQUE
fB: BRAKE FLAG

METHOD AND APPARATUS FOR CONTROLLING ANTEROPOSTERIOR ACCELERATION OF A VEHICLE

CROSS-REFERENCE TO RELATED APPLICATION

This application is based on and claims the benefit of priority from earlier Japanese Patent Application No. 2007-209243 filed Aug. 10, 2007, the description of which is incorporated herein by reference.

BACKGROUND OF THE INVENTION

1. Technical Field of the Invention

The present invention relates to an apparatus and system for controlling vehicles, which is used in vehicles having a motive power generation apparatus configured to transmit torque of the output shaft to the drive wheels through a staged transmission apparatus, and in particular, to an apparatus and system for controlling vehicles, which is able to perform feedback control for bringing an actual acceleration in the vehicular anteroposterior (front-rear or vehicle-longitudinal) direction to the level of a target acceleration in such vehicles.

2. Related Art

This type of control apparatus is disclosed, for example, in Japanese Patent Laid-Open No. 2006-506270. According to the technique disclosed in this literature, calculation is made as to the torque requested for performing feedback control to bring an actual acceleration to the level of a target acceleration, and then the actuator is manipulated to control the actual torque to the requested torque. According to the control disclosed in the literature, requests from various applications for automatic control, such as cruise control and intervehicle (vehicle distance) control, can be expressed in terms of a target acceleration. Accordingly, it is not necessary to perform matching of the applications for the specification of every vehicle. That is, the only matching that should be performed for every vehicle is for the processing function which is used in setting a manipulated variable of an actuator to feedback-control the actual acceleration to a target acceleration.

In the case where a vehicle to be controlled is equipped with an automatically staged transmission apparatus, transmission of motive power is once interrupted between the motive power generation apparatus and the drive wheels, when the vehicle is under gear ratio switchover control. For this reason, during this control, no control can be performed for the acceleration of the vehicle, and thus the degree of difference between the actual acceleration and a target acceleration may sometimes be increased. In this case, the absolute value of the manipulated variable of the actuator, which value is calculated through feedback control, will be excessively large. Then, when the motive power is eventually transmitted from the motive power generation apparatus to the drive wheels with the progress of the gear ratio switchover control performed by the staged transmission apparatus, there is a risk that inappropriate driving force may be transmitted to the drive wheels because the actual acceleration is being controlled to the target acceleration. As a result, shock may be caused to the vehicle.

SUMMARY OF THE INVENTION

The present invention has been made to resolve the problem described above, and has as its object to provide a control apparatus and system for vehicles, which are used in vehicles having a motive power generation apparatus configured to transmit torque of the output shaft to the drive wheels through a staged transmission apparatus, and can appropriately feedback-control the actual acceleration in the anteroposterior (or vehicle-longitudinal) direction to a target acceleration.

In order to achieve the above object, as one aspect of the present invention, there is provided a control apparatus for controlling anteroposterior acceleration of a vehicle by controlling a motive power generation apparatus mounted on a vehicle provided with drive wheels and a staged transmission apparatus that operates on gear ratios, the motive power generation apparatus having an output shaft producing a rotation force in response to a command (Tw) to be requested, the rotation force being transmitted to the drive wheels via the staged transmission apparatus. This control apparatus comprises command production means (B28) for producing the command at intervals; manipulated variable calculation means (B24) for i) calculating a feedback manipulated variable (Tfb) necessary for controlling the production of the rotation force of the motive power generation apparatus so that an actual value of anteroposterior acceleration of the vehicle is controlled at a target value of the acceleration and ii) providing the calculated feedback manipulated variable to the command production means so that the command production means uses the feedback manipulated variable as the command; determining means (S60) for determining whether or not the staged transmission apparatus is in a switchover control of the gear ratio; and limitation means (S62) for limiting the manipulated variable from being calculated when it is determined by the determining means that the staged transmission apparatus is in the switchover control of the gear ratios.

This configuration can also be applied to a control apparatus for controlling behaviors of a vehicle provided with drive wheels.

During the gear ratio switchover control, the torque is not transmitted from the motive power generation apparatus to the drive wheels. Accordingly, the actual anteroposterior acceleration of the vehicle and the target acceleration are likely to be drastically deviated from each other. In this regard, in the above invention, the feedback manipulated variable is limited during the gear ratio switchover control. Accordingly, the feedback manipulated variable can be prevented from being drastically changed during this switchover control, being caused by the difference between the actual acceleration and the target acceleration. Thus, even immediately after finishing the switchover control, the feedback manipulated variable can be prevented from excessively deviated from a proper value.

It is preferred that the limitation means is configured to stop the calculation of the manipulated variable. In this invention, the feedback manipulated variable can be prevented from being excessively deviated from a proper value immediately after finishing the gear ratio switchover control, by stopping calculation of the feedback manipulated variable during the switchover control.

It is still preferred that the control apparatus further comprises difference calculation means (B22) for calculating a value indicative of difference between the actual acceleration and the target value of the acceleration; and accumulated value calculation means for calculating an accumulated value of the value indicative of the difference, wherein the manipulated variable calculation means is configured to calculate the manipulated variable in consideration of the accumulated value, and the limitation means is configured to enable the accumulated value calculation means to store the accumulated value currently calculated by the accumulated value calculation means, when the limitation means stops the calculation of the manipulated variable.

The accumulated value is correlated to the manipulated variable which is requested for controlling the actual acceleration to a target acceleration, in the travel conditions before the gear ratio switchover control. Accordingly, immediately following the gear ratio switchover control as well, the accumulated value is considered to have a correlation with the manipulated variable which is requested for controlling the actual acceleration to the target acceleration. Focusing on this, the present invention enables use of this accumulated value in the calculation of the manipulated variable for controlling the actual acceleration to the target acceleration even immediately following the gear ratio switchover control, by permitting the previous accumulated value to be retained during the switchover control. Thus, a proper manipulated variable can be calculated, by which the actual acceleration can be controlled to a target acceleration immediately after finishing the switchover control.

It is also preferred that the control apparatus further comprising differential calculation means calculating a value of differential of the value indicative of the difference, wherein the manipulated variable calculation means is configured to calculate the manipulated variable in consideration of at least one of the value indicative of the difference and the value of the differential, and the limitation means comprises initialization means for initializing the at least one of the value indicative of the difference and the value of the differential when it is determined by the determining means that the staged transmission apparatus is in the switchover control of the gear ratios.

The actual acceleration may be drastically deviated from a target acceleration during the gear ratio switchover control, due to the necessity of initializing at least one of the values mentioned above, which are used for the calculation in the feedback control during the switchover control. Even in such conditions, the above invention may not allow the feedback manipulated variable to be changed depending on the degree of difference. Thus, the feedback manipulated variable at the time when the torque of the motive power generation apparatus can eventually be transmitted with the progress of the switchover control, can be favorably prevented from becoming an excessively improper value due to the difference caused by the switchover control.

Further, by way of example, the control apparatus further comprises manipulated variable calculation means (B26) for i) calculating a feedforward manipulated variable (Tff) necessary for controlling the production of the rotation force of the motive power generation apparatus so that an actual value of acceleration of the vehicle is controlled at a target value of the acceleration and ii) providing the calculated feedback manipulated variable to the command production means, wherein the command production means is configured to produce the command using the feedback.

In this configuration, even immediately after finishing the gear ratio switchover control, the feedforward manipulated variable for controlling the actual acceleration to a target acceleration can be given by the feedback manipulated variable. Thus, deterioration in the controllability immediately after finishing the switchover control can be prevented, which deterioration is caused by the limitation of the feedback manipulated variable by the limiting means.

As another aspect of the present invention, there is provided a method of controlling anteroposterior acceleration of a vehicle by controlling a motive power generation apparatus mounted on a vehicle provided with drive wheels and a staged transmission apparatus that operates on gear ratios, the motive power generation apparatus having an output shaft producing a rotation force in response to a command (Tw) to be requested, the rotation force being transmitted to the drive wheels via the staged transmission apparatus, comprising step of: producing the command at intervals; calculating a feedback manipulated variable (Tfb) necessary for controlling the production of the rotation force of the motive power generation apparatus so that an actual value of anteroposterior acceleration of the vehicle is controlled at a target value of the acceleration and providing the calculated feedback manipulated variable to the command production means so that the command production means uses the feedback manipulated variable as the command; determining whether or not the staged transmission apparatus is in a switchover control of the gear ratio; and limiting the manipulated variable from being calculated when it is determined by the determining means that the staged transmission apparatus is in the switchover control of the gear ratios. In this configuration, even immediately after finishing the switchover control, the feedback manipulated variable can be prevented from excessively deviated from a proper value, like the foregoing control apparatus.

DETAILED DESCRIPTION OF THE PREFERRED EMBODIMENTS

With reference to the accompanying drawings, hereinafter will be described a vehicle control apparatus according to an embodiment of the present invention.

Figure 1:
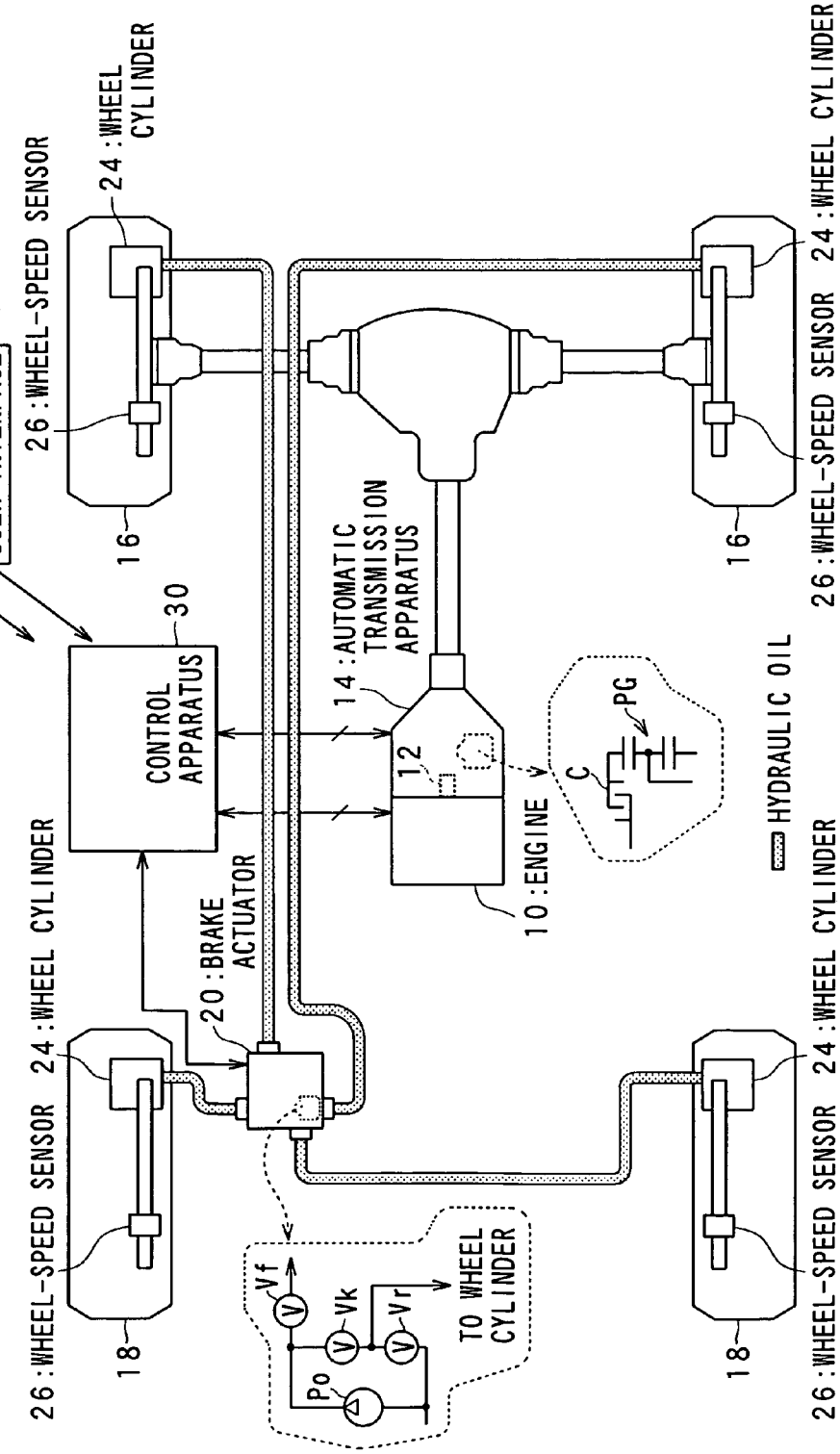
FIG. 1 illustrates a general configuration of a vehicle control system, according to an embodiment of the present invention.

FIG. 1 illustrates a general configuration of the vehicle control system, according to the present embodiment.

An engine 10, a gasoline powered internal combustion engine, includes a crank shaft 12 to which an automatic transmission system 14 is connected. The automatic transmission system 14 is provided with a torque converter and a planetary gear automatic transmission. In the planetary gear automatic transmission, any of a plurality of power transmission paths formed by planetary gears PG is selected, depending on the engagement conditions of a clutch C and a brake (not shown) as friction elements. The planetary gear automatic transmission is adapted to realize a gear ratio according to the selected power transmission path. The torque of the crank shaft 12 of the engine 10 is changed by the automatic transmission system 14 and then transmitted to drive wheels 16.

The drive wheels 16 and idler wheels 18 can be imparted with braking force by a hydraulic brake actuator 20. In addition to an electrical pump Po, the brake actuator 20 is provided with a retention valve Vk and a decompression valve Vr, for each of the wheels (the drive wheels 16 and the idler wheels 18). The retention valve Vk retains the pressure of the hydraulic oil supplied to a wheel cylinder 24, and the decompression valve Vr reduces the pressure of the hydraulic oil in the wheel cylinder 24. The brake actuator 20 is also provided with a linear relief valve Vf for causing pressure difference between the side of a master cylinder, not shown, and the side of the wheel cylinder 24. The discharge side of the pump Po is connected to the suction side of the pump Po via the retention valve Vk and the decompression valve Vr. The hydraulic oil is flowed in/out between the connected portion of the retention valve Vk and the decompression valve Vr, and the wheel cylinder 24.

The operation of the linear relief valve Vf, the retention valve Vk and the decompression valve Vr can realize automatic brake control which is performed independent of the user's brake operation which realizes anti-brake lock braking control (ABS), traction control and skid prevention control, for example. Specifically, in retaining braking force, the pressure of the hydraulic oil in the wheel cylinder 24 is retained by closing both of the retention valve Vk and the decompression valve Vr. In decreasing braking force, the pressure in the wheel cylinder 24 is lowered by closing the retention valve Vk and opening the decompression valve Vr.

In increasing braking force, the pressure of the hydraulic oil supplied to the wheel cylinder 24 is raised by opening the linear relief valve Vf and the retention valve Vk and closing the decompression valve Vr. In this case, the pressure in the wheel cylinder 24 is controlled by controlling the current supply for the linear relief valve Vf. Specifically, the linear relief valve Vf is adapted to cause pressure difference between the side of the master cylinder and the side of the wheel cylinder 24, as mentioned above, in proportion to the amount of current supply. Accordingly, the pressure difference can be adjusted according to the amount of current supply, which is eventually led to the pressure control in the wheel cylinder 24. In particular, in the case where the user's brake operation for realizing skid prevention control, for example, is not performed, the pump Po is actuated to produce a pressure to be applied into the wheel cylinder 24, while at the same time, the pressure is adjusted according to the amount of current supply to the linear relief valve Vf.

In this regard, hysteresis may be caused to the pressure difference between the side of the master cylinder and the side of the wheel cylinder 24, accompanying the increase and decrease in the amount of current supply mentioned above. In order to reduce the hysteresis, the operation of current supply to the linear relief valve Vf is carried out based on time-ratio control for adjusting time ratio between logic "H" and logic "L" of applied voltage (the ratio of logic "H" to the time periods of logic "H" and logic "L": duty). The frequency (dither frequency) of the time-ratio control ranges from about "1 kHz" to "several khz's", for example.

Each of the drive wheels 16 and the idler wheels 18 is provided with a wheel-speed sensor 26 for detecting the rotational speed of the wheel.

A control apparatus 30, which is for example provided with a CPU (central processing unit) and memories to compose a computer system for the control, controls the travel conditions of the vehicle. Specifically, the control apparatus 30 retrieves detection values of various sensors for detecting the operating conditions of the engine 10 and the automatic transmission system 14, as well as the output signals of the wheel-speed sensors 26, a user interface 32 and an acceleration sensor 34 to control traveling of the vehicle based on these values and signals. The user interface 32 includes an automatic travel switch through which the user can request automatic travel of the vehicle, and an accelerator operating member through which the user can request torque increase to the engine 10. The accelerator sensor 34 is adapted to detect acceleration based on the force applied to the sensor per se. A pendulum type or strain-gauge type sensor, for example, can serve as the accelerator sensor 34.

When a request for automatic travel is inputted by the user through the user interface 32, the control apparatus 30 controls the actual speed (actual acceleration) of the vehicle to a target value (target acceleration). The details are provided below.

Figure 2:
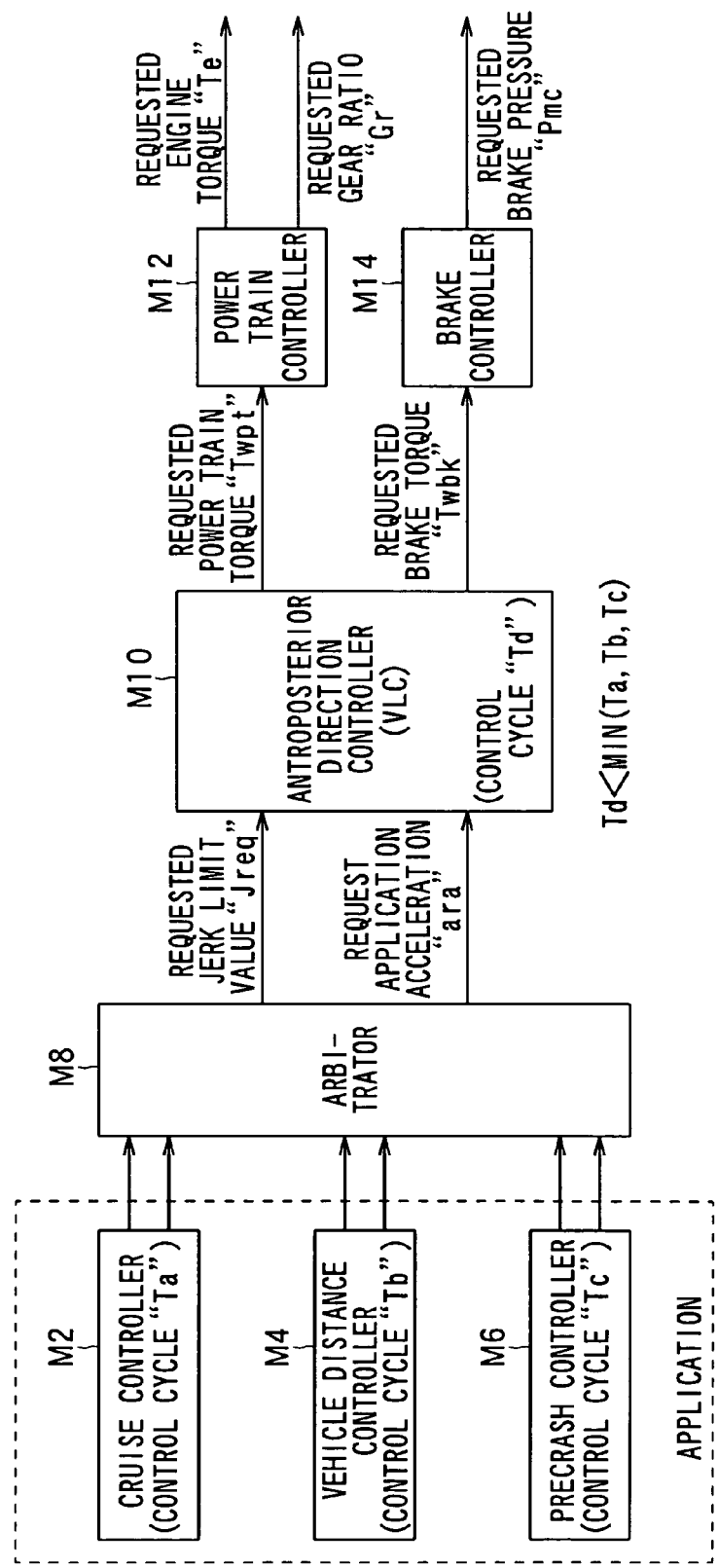
FIG. 2 is a block diagram illustrating the processes concerning automatic travel control, according to the embodiment.

FIG. 2 shows the processes associated, in particular, with the automatic travel control, among the processes performed by the control apparatus 30.

FIG. 2 exemplifies such automatic travel applications as a cruise controller M2, a vehicle distance controller M4 and a precrash controller M6. The cruise controller M2 controls the travel speed of the vehicle to be kept at a certain level. The vehicle distance controller M4 controls the distance between the vehicle and a preceding vehicle to a predetermined distance. The precrash controller M6 controls the shock of possible collision with the preceding vehicle to be mitigated. The cruise controller M2, the vehicle distance controller M4 and the precrash controller M6 all output a requested value of acceleration (requested acceleration) and a requested limit value of jerk that will be described later.

An arbitrator M8 outputs a finally requested jerk limit value "Jreq" and a requested acceleration (application acceleration "ara") based on the outputs from the cruise controller M2, the vehicle distance controller M4 and the precrash controller M6.

An anteroposterior (or vehicle-longitudinal) direction controller (VLC) M10 outputs: a requested power-train torque "Twpt" which is a torque requested for the power train made up of the engine 10 and the automatic transmission system 14; and a requested brake torque "Twbk" which is a torque requested for the brake actuator 20. A control cycle "Td" of the anteroposterior direction controller M10 is different from a control cycle "Ta" of the cruise controller M2, a control cycle "Tb" of the vehicle distance controller M4 and a control cycle "Tc" of the precrash controller M6. Specifically, the cycle "Td" of the anteroposterior direction controller M10 is set shorter than the cycle "Ta" of the cruise controller M2, the cycle "Tb" of the vehicle distance controller M4 and the cycle "Tc" of the precrash controller M6. This is because the applications are adapted to calculate requested acceleration based on various detection values obtained from detecting means, such as one which detects a preceding vehicle by radar, and thus because the detection cycles of these detecting means tend to be longer than the detection cycles of actual vehicle speed and actual acceleration.

A power train controller M12 outputs a requested value of torque for the engine 10 (requested engine torque "Te"), and a requested value of gear ratio for the automatic transmission system 14 (requested gear ratio "Gr"), in response to the requested power train torque "Twpt". A brake controller M14 outputs a requested value of hydraulic oil pressure for the brake actuator 20 (requested brake pressure "Pmc"), in response to the requested brake torque "Twbk". It should be appreciated that the requested brake pressure "Pmc" is a manipulated variable of the brake actuator 20 which adjusts, through the hydraulic oil pressure, the braking force in each of the drive wheels 16 and the idler wheels 18.

All the controllers and arbitrator are, for example, functionally realized by the computer system.

Figure 3:
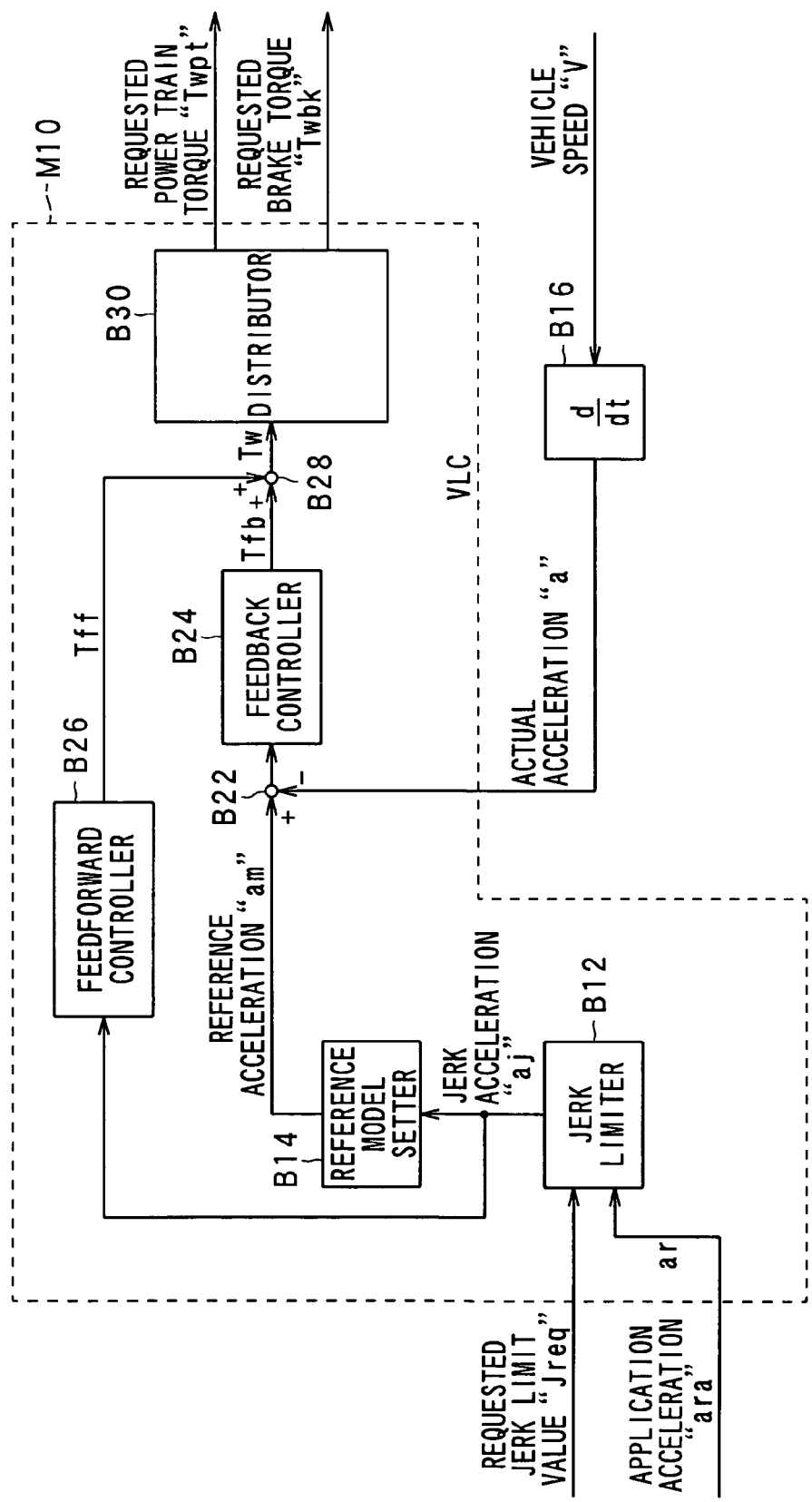
FIG. 3 is a block diagram illustrating in detail the processes performed by an anteroposterior (front-rear or vehicle-longitudinal) direction controller, according to the embodiment.

FIG. 3 shows in detail the processes performed by the anteroposterior direction controller M10.

The anteroposterior direction controller M10 outputs the application acceleration "ara", which has been outputted from the arbitrator M8, to the jerk limiter B12 as a requested acceleration "ar". The jerk limiter B12 limits the amount of change in the acceleration in one control cycle of the anteroposterior direction controller M10, to a value equal to or less than the requested jerk limit value "Jreq".

Figure 4:
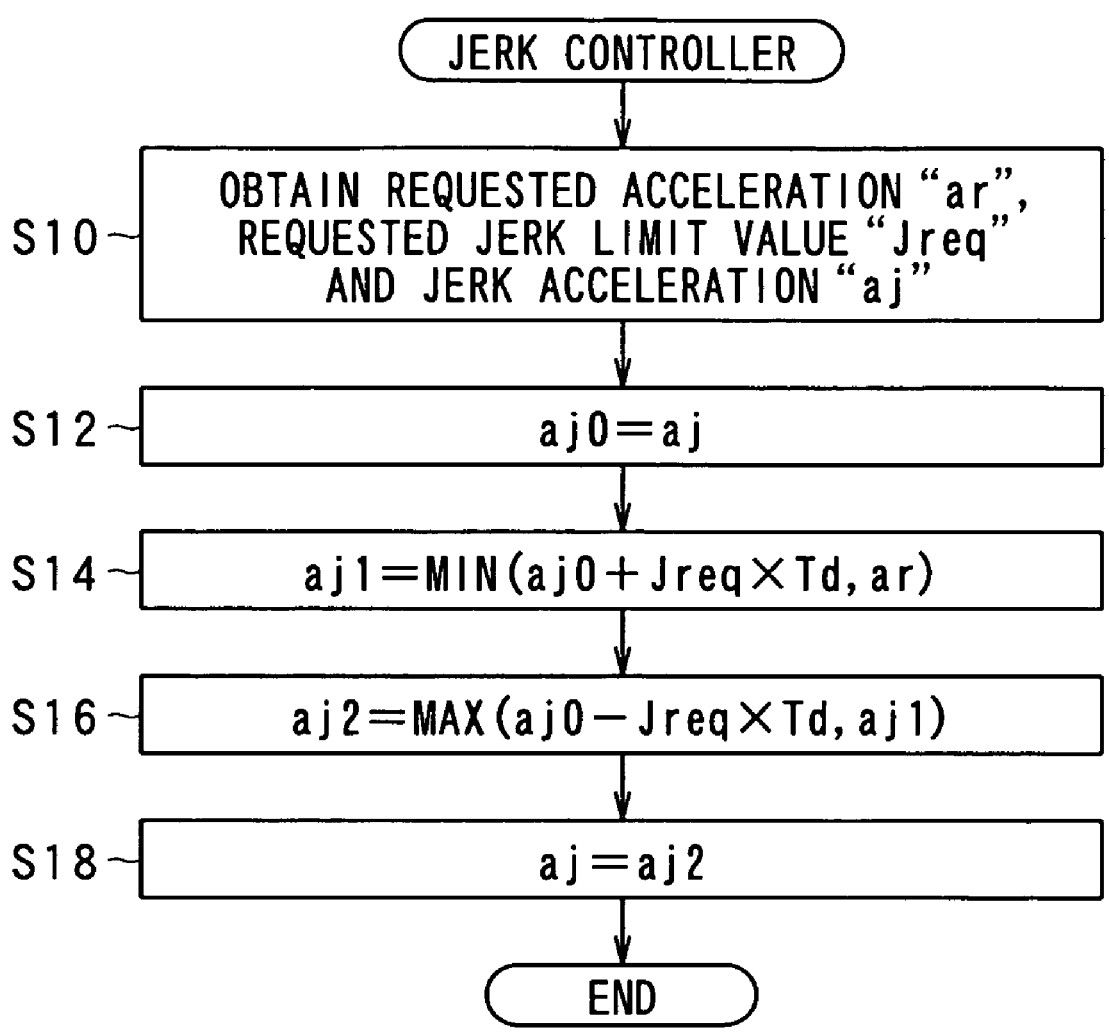
FIG. 4 is a flow diagram illustrating a procedure performed by a jerk limiter of the anteroposterior direction controller.

FIG. 4 shows a series of processes performed by the jerk limiter B12. First, at step S10, the jerk limiter B12 obtains the requested acceleration "ar", the requested jerk limit value "Jreq" and a jerk acceleration "aj" that is the present output of the jerk limiter B12. At the subsequent step S12, the jerk acceleration "aj" is set as a previous value "aj0". At steps S14 and S16, the change in the requested acceleration "ar" is limited so that the difference from the previous value "aj0" will be equal to or less than the jerk limit value "3req". That is, at step S16, a value "aj1" is calculated, which value corresponds to a value obtained by multiplying the jerk limit value "Jreq" with the control cycle "Td" and adding the resultant value to the previous value "aj0", or corresponds to the requested acceleration "ar", whichever is smaller. At the subsequent step S16, a value "aj2" is calculated, which value corresponds to a value obtained by multiplying the jerk limit value "Jreq" with the control cycle "Td" and subtracting resultant value from the previous value "aj0", or corresponds to the smaller value "aj1" mentioned above, whichever is larger. At step S18, the larger value "aj2" is set as the jerk acceleration "aj".

Thus, in one control cycle of the applications, the jerk acceleration "aj" is shifted stepwise to the requested acceleration "ar" at every control cycle "Td" of the anteroposterior direction controller M10, with the jerk limit value "Jreq" as being the maximum amount of change.

In the anteroposterior direction controller M10, the vehicle acceleration is controlled to the jerk acceleration "aj" by two-degree freedom control. In particular, the actual acceleration is feedback-controlled to the jerk acceleration "aj", and at the same time, the actual acceleration is feedforward controlled to the jerk acceleration "aj". An explanation will be given first on the feedback control.

<Feedback Control>

Figure 5A:
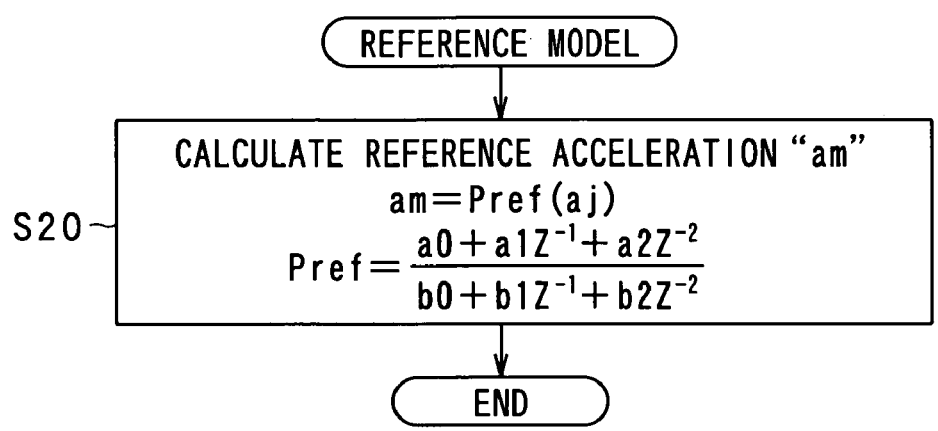
FIG. 5A is a flow diagram illustrating a procedure performed by a reference model setter of the anteroposterior direction controller.
Figure 5B:
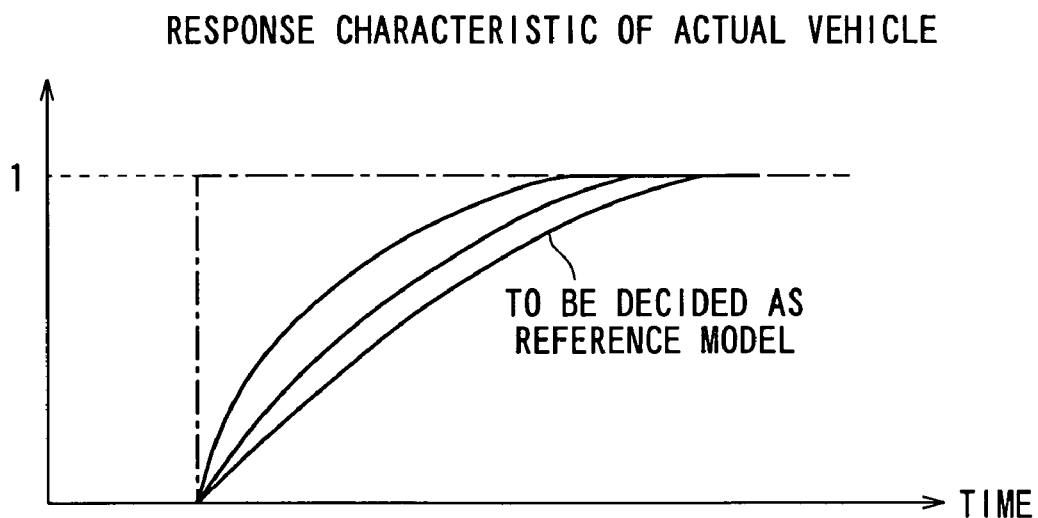
FIG. 5B is a diagram illustrating response characteristics of actual vehicle.

A reference model setter B14 shown in FIG. 3 outputs a reference acceleration "am" by converting the jerk acceleration "aj" in terms of a reference model. The reference model is to determine a behavior of the target acceleration in a transient travel time period of the vehicle, during which the jerk acceleration "aj" changes. The process performed by the reference model setter B14 is shown in FIG. 5A as step S20. Specifically, the reference model is a primary delay model, and thus the jerk acceleration "aj" is converted in terms of the primary delay model. As shown in FIG. 5B, the primary delay model is set based on the response characteristics at the time when the response delay of the actual acceleration is maximized, in a step change of the target acceleration. More specifically, the response characteristics are supposed to change according to the operating conditions of the vehicle, such as the rotational speed of the engine 10. Thus, in the changing operating conditions, the characteristics at the time when the response delay is maximized are used as the base for the primary delay model.

A differential operator B16 shown in FIG. 3 performs an operation by differentiating an actual vehicle speed "V" with respect to time. The actual vehicle speed "V" is based on the detection value derived from the wheel-speed sensor 26 provided at each of the drive wheels 16 and the idler wheels 18. In particular, the actual vehicle speed "V" may, for example, be an average of the detection values of the four wheel-speed sensors 26, or a maximum value of the detection values.

A difference calculator B22 calculates a difference (error "err") between an actual acceleration "a" outputted from the differential operator B16 and the reference acceleration "am" outputted from the reference model setter B14.

Figure 6:
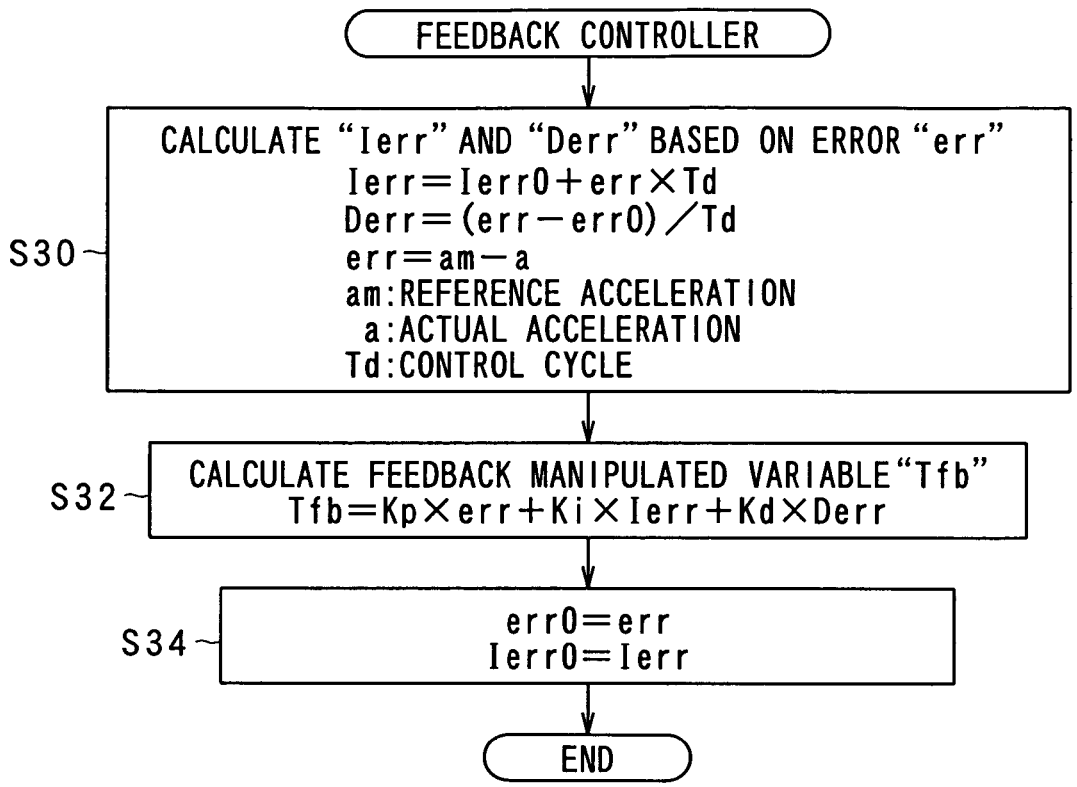
FIG. 6 is a flow diagram illustrating a procedure performed by a feedback controller of the anteroposterior direction controller.

A feedback controller B24 is adapted to feed back the actual acceleration "a" to the reference acceleration "am". In the present embodiment, in particular, the feedback controller B24 performs proportional-integral-differential (PID) control. FIG. 6 shows a series of processes performed by feedback controller B24.

First, at step S30, an integral value "Ierr" and a differential value "Derr" are calculated based on the difference "err". Particularly, the current integral value "Ierr" is calculated by multiplying the current difference "err" with the control cycle "Td" and adding the resultant to a previous integral value "Ierr0". Also, the differential value "Derr" is calculated by subtracting a previous difference "err0" from the current difference "err" and dividing the resultant by the control cycle "Td". At the subsequent step S32, a feedback manipulated variable "Tfb" is calculated. Particularly, the feedback manipulated variable "Tfb" is calculated by summing up: a value obtained by multiplying the difference "err" with a proportional gain "Kp"; a value obtained by multiplying the integral value "Ierr" with an integral gain "Ki"; and a value obtained by multiplying the differential value "Derr" with a differential gain "Kd". The proportional gain "Kp", the integral gain "Ki" and the differential gain "Kd" are for converting the integral value "Ierr" and the differential value "Derr" into the requested torque. In other words, the feedback manipulated variable "Tfb" represents a torque requested for rendering the actual acceleration "a" to be the reference acceleration "am". When the process pf step S32 is completed, the difference "err" is stored, at step S34, as the previous difference "err0" and the integral value "Ierr" is stored as the previous integral value "Ierr0".

<Feedforward Control>

Hereinafter is explained the feedforward control in the two-degree freedom control mentioned above.

Figure 7:
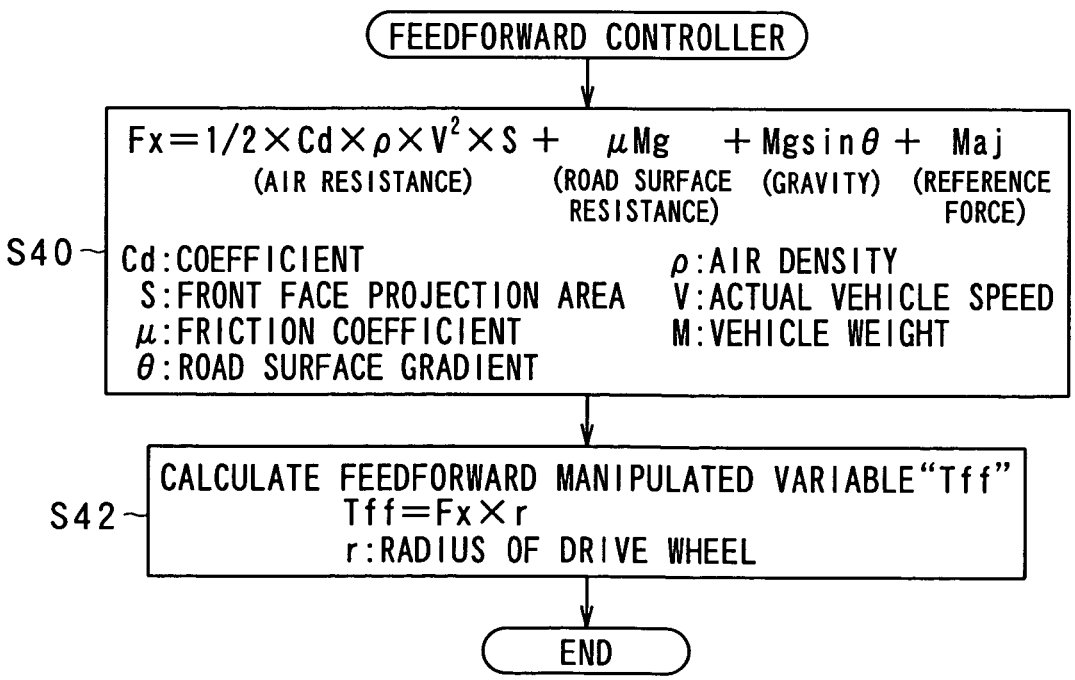
FIG. 7 is a flow diagram illustrating a procedure performed by a feedforward controller of the anteroposterior direction controller.

A feedforward controller B26 shown in FIG. 3 performs the feedforward control to achieve the jerk acceleration "aj". FIG. 7 shows a series of processes performed by the feedforward controller B26.

First, at step S40, a force "Fx" is calculated, which should be added to the travel direction of the vehicle to achieve the jerk acceleration "aj". At this step, the force "Fx" is calculated as a sum of air resistance, road surface resistance, gravity and reference force. The reference force can be obtained by multiplying the jerk acceleration "aj" with a vehicle weight "M". The reference force is necessary for having the vehicle traveled at the jerk acceleration "aj" in the state where no resistance is added in traveling the vehicle. The air resistance is a force of air, which is added in the direction reverse of the travel direction of the vehicle. In the present embodiment, the air resistance is calculated by multiplying the square of the actual vehicle speed "V" with an air density "p", a coefficient "Cd" and a projection area "S" of the vehicle front, followed by multiplication with "½". The road surface resistance is a resistance caused by the friction between the road surface and the drive wheels 16 and the idler wheels 18, and is calculated by the multiplication of a friction coefficient "i", the vehicle weight "M" and a gravity acceleration "g". The term "gravity" refers to a gravity which is applied to the travel direction of the vehicle when the road surface is inclined. This "gravity" can be expressed by "Mg sin θ" using a road surface gradient "θ". It should be appreciated that the road surface gradient "θ" is calculated based on the actual vehicle speed "V" and the detection value of the acceleration sensor 34 mentioned above.

At the subsequent step S42, a feedforward manipulated variable "Tff" is calculated by multiplying the force "Fx" with a radius "r" of the drive wheel 16. The feedforward manipulated variable "Tff" is the torque requested for having the vehicle traveled at the jerk acceleration "aj".

An axle torque calculator B28 shown in FIG. 3 calculates a requested axle torque "Tw" by adding the feedback manipulated variable "Tfb" to the feedforward manipulated variable "Tff".

Figure 8:
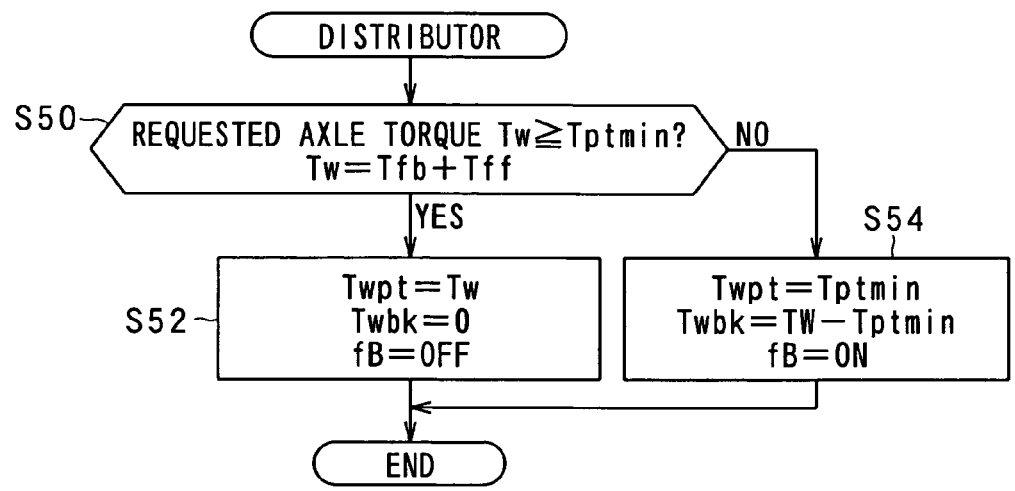
FIG. 8 is a flow diagram illustrating a procedure performed by a distributor of the anteroposterior direction controller.

A distributor B30 divides (distributes) the requested axle torque "Tw" into the requested power train torque "Twpt" and the requested brake torque "Twbk". FIG. 8 shows a series of processes performed by the distributor B30.

First, at step S50, it is determined whether or not the requested axle torque "Tw" is equal to or more than a minimal torque "Tptmin". This process determines whether or not the requested axle torque "Tw" can be produced only by the power train. In this regard, the minimal torque "Tptmin" here is the minimal torque that is available by the engine 10 and the automatic transmission system 14. If the requested axle torque "Tw" is equal to or more than the minimal torque "Tptmin", the requested axle torque "Tw" is determined as can be realized only by the power train, and control proceeds to step S52. At step S52, the requested power train torque "Twpt" is set as the requested axle torque "Tw", while the requested brake torque "Twbk" is set to zero. On the other hand, if a negative determination is made at step S50, the requested axle torque "Tw" is determined as cannot be produced only by the power train, and control proceeds to step S54. At step S54, the requested power train torque "Twpt" is set as the minimal torque "Tptmin", and the requested brake torque "Twbk" is set as a value obtained by subtracting the minimal torque "Tptmin" from the requested axle torque "Tw".

According to the series of processes described above, the actual acceleration of the vehicle can be controlled to the jerk acceleration "aj". In the case where the jerk acceleration "aj" changes, the actual acceleration can be properly controlled to the reference acceleration "am". In other words, in the case where the jerk acceleration "aj" changes and where the acceleration of the vehicle is feedforward controlled to the jerk acceleration "aj", response delay is caused in the actual acceleration with respect to the change in the jerk acceleration "aj", due to the response delay of the vehicle. However, the actual acceleration estimated from the response delay can be approximated to the reference acceleration "am". In addition, owing to the feedback control, the actual acceleration can be controlled to the reference acceleration "am" with high accuracy.

When gear ratio switchover control is performed by the automatic transmission system 14, the engaging condition of each of the clutch C and the brake, which are friction elements, is switched. Accordingly, the torque of the crank shaft 12 of the engine 10 is temporarily disabled from being transmitted to the side of the drive wheels 16 via the automatic transmission system 14. For this reason, the power train will not be able to generate torque for controlling the actual acceleration to the reference acceleration "am". In this case, it is likely that the actual acceleration "a" may be drastically deviated from the reference acceleration "am". In particular, during kickdown transmission, for example, i.e. during an operating condition where the acceleration is raised, the torque that should be generated by the power train is requested to be increased in response to the increase of the reference acceleration "am". However, with the gear ratio switchover control, the torque is no longer transmitted from the power train to the drive wheels 16. As a result, the actual acceleration "a" may be slowed down comparing with the reference acceleration "am". When the actual acceleration "a" becomes slower than the reference acceleration "am", the absolute value of the feedback manipulated variable "Tfb" will be increased because the actual acceleration "a" is being controlled so as to follow up the reference acceleration "am". As a result, the power train will be manipulated with a manipulated variable which is excessively deviated from a proper manipulated variable. Thus, when the torque of the engine 10 is eventually transmitted to the side of the drive wheels 16 in the progress of gear ratio switchover control, the actual acceleration "a" may become faster than the reference acceleration "am" and be excessively raised.

In the present embodiment, in order to cope with such a hunting state of the actual acceleration "a" accompanying the gear ratio switchover control, the feedback manipulated variable "Tfb" is limited, in the present embodiment, during the gear ratio switchover control. The details are be described below.

Figure 9:
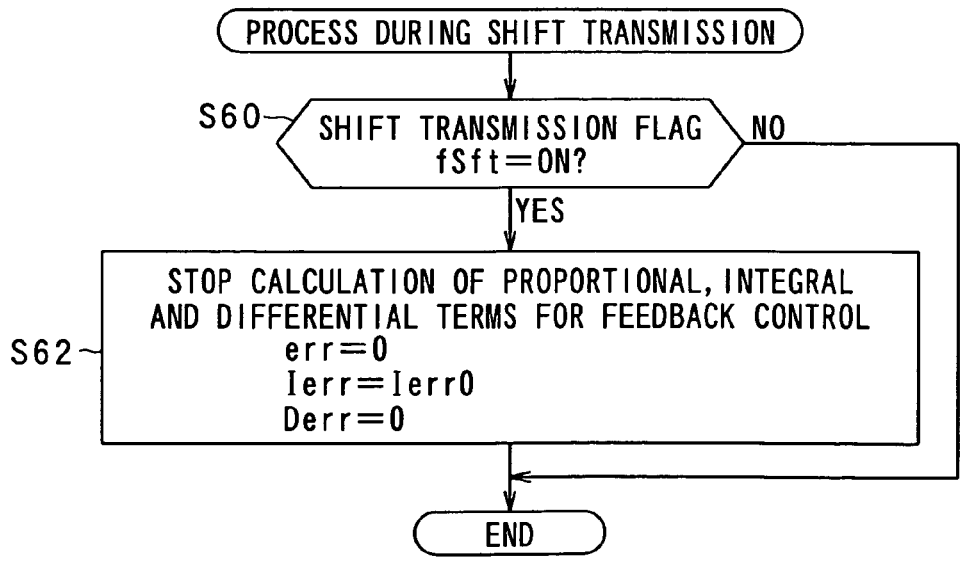
FIG. 9 is a flow diagram illustrating a procedure for controlling feedback manipulated variable during shift transmission, according to the embodiment.

FIG. 9 illustrates a series of processes for limiting the feedback manipulated variable "Tfb" during shift transmission. These processes are repeatedly performed at a predetermined period, for example, by the control apparatus 30.

First, at step S60, it is determined whether or not a shift transmission flag "fSft" is in an on-state, which flag indicates that the gear ratio switchover control is being performed. If the shift transmission flag fSft is determined as being in an on-state, it is determined that the gear ratio switchover control is being performed. Then, control proceeds to step S62 to limit the feedback manipulated variable "Tfb". In other words, the difference "err" is initialized to initialize a proportional term, and at the same time, a differential term is initialized. Further, an integral value "Iere" is set to a previous integral value "Ierr0" in order to retain an integral term at a value before the gear ratio switchover control.

The integral term immediately preceding the switchover control is considered to correspond to an amount of error in the feedforward control for the jerk acceleration "aj", performed by the feedforward controller B26. The feedforward controller B26 calculates the feedforward manipulated variable "Tff" to control the vehicle acceleration to the jerk acceleration "aj", however, there may be an error between the conditions estimated in performing this calculation and the actual conditions. For example, if the vehicle weight "M" is the weight of the vehicle body as described in the specification or the like, an error may be caused, for example, because of the possible presence of the passengers and the amount of load. This, accordingly, will be led to possible errors in the road surface resistance, the gravity and the reference force which are calculated at step S40 of FIG. 7 by the feedforward controller B26. Also, when the friction coefficient "μ" is set assuming specific road surface conditions, an error may be caused because of the difference between the assumed friction coefficient "μ" and the actual friction coefficient which is derived, for example, from the conditions of the road surface the vehicle currently travels, specification of the tires and the degree of wear. Further, when the air density "ρ" is set to a value assuming a specific temperature, an error may be caused between the assumed air density and the actual air density because of the difference between the actual outside air temperature and the specific temperature. In this way, when the assumed conditions (vehicle conditions and external environmental conditions) are deviated from the actual conditions in calculating the feedforward manipulated variable "Tff", an error may be caused in controlling the actual acceleration "a" to the jerk acceleration "aj" based on the calculated feedforward manipulated variable "Tff". This error can be compensated by the integral term in the steady travel of the vehicle.

Thus, by retaining the integral term during the gear ratio switchover control, the control error ascribed to the feedforward manipulated variable "Tff" can be compensated immediately after finishing the gear ratio switchover control. In particular, since the differences between the assumed conditions and the actual conditions, which do not change in a short time, are considered to be substantially constant in the vicinity of the gear ratio switchover control, the integral term before the gear ratio switchover control can be considered to be a proper value for compensating the error of the feedforward control that follows the gear ratio switchover control.

When the process of step S62 is completed or when a negative determination is made at step S60, the series of processes are once ended.

Figure 10:
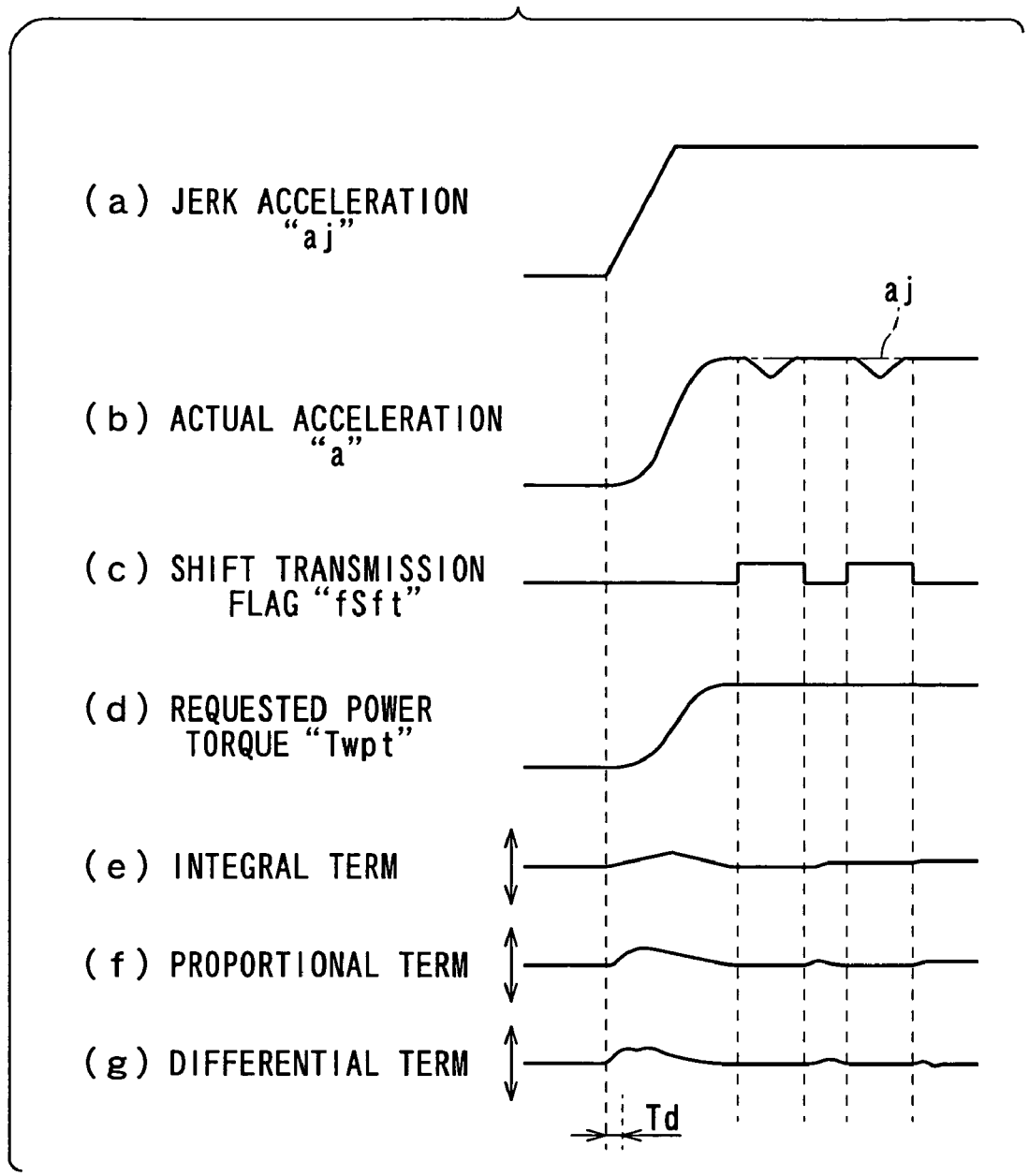
FIG. 10 is a time diagram illustrating a mode for limiting a feedback manipulated variable during the shift transmission, according to the embodiment.

FIG. 10 illustrates a mode of an acceleration control in the vicinity of the gear ratio switchover control according to the present embodiment is performed. Particularly, FIG. 10(a) illustrates the transition of the jerk acceleration "aj", FIG. 10(b) illustrates the transition of the actual acceleration "a", FIG. 10(c) illustrates the transition of the shift transmission flag "fSft", FIG. 10(d) illustrates the transition of the requested power train torque "Twpt", FIG. 10(e) illustrates the transition of the integral term, FIG. 10(f) illustrates the transition of the proportional term, and FIG. 10(g) illustrates the transition of the differential term. As illustrated in the figures, the requested power train torque "Twp" is increased as the jerk acceleration "aj" is increased. However, upon start of the shift transmission control, the actual acceleration "a" is temporarily slowed down comparing with the jerk acceleration "aj" because the power train torque "Twpt" is not transmitted to the drive wheels 16. However, with the eventual transmission of the torque of the engine 10 to the side of the drive wheels 16 via the automatic transmission system 14 with the progress of the gear ratio switchover control, the actual acceleration "a" comes to follow up the jerk acceleration "aj". Accordingly, the actual acceleration "a" can be suppressed from being changed during the gear ratio switchover control.

Figure 11:
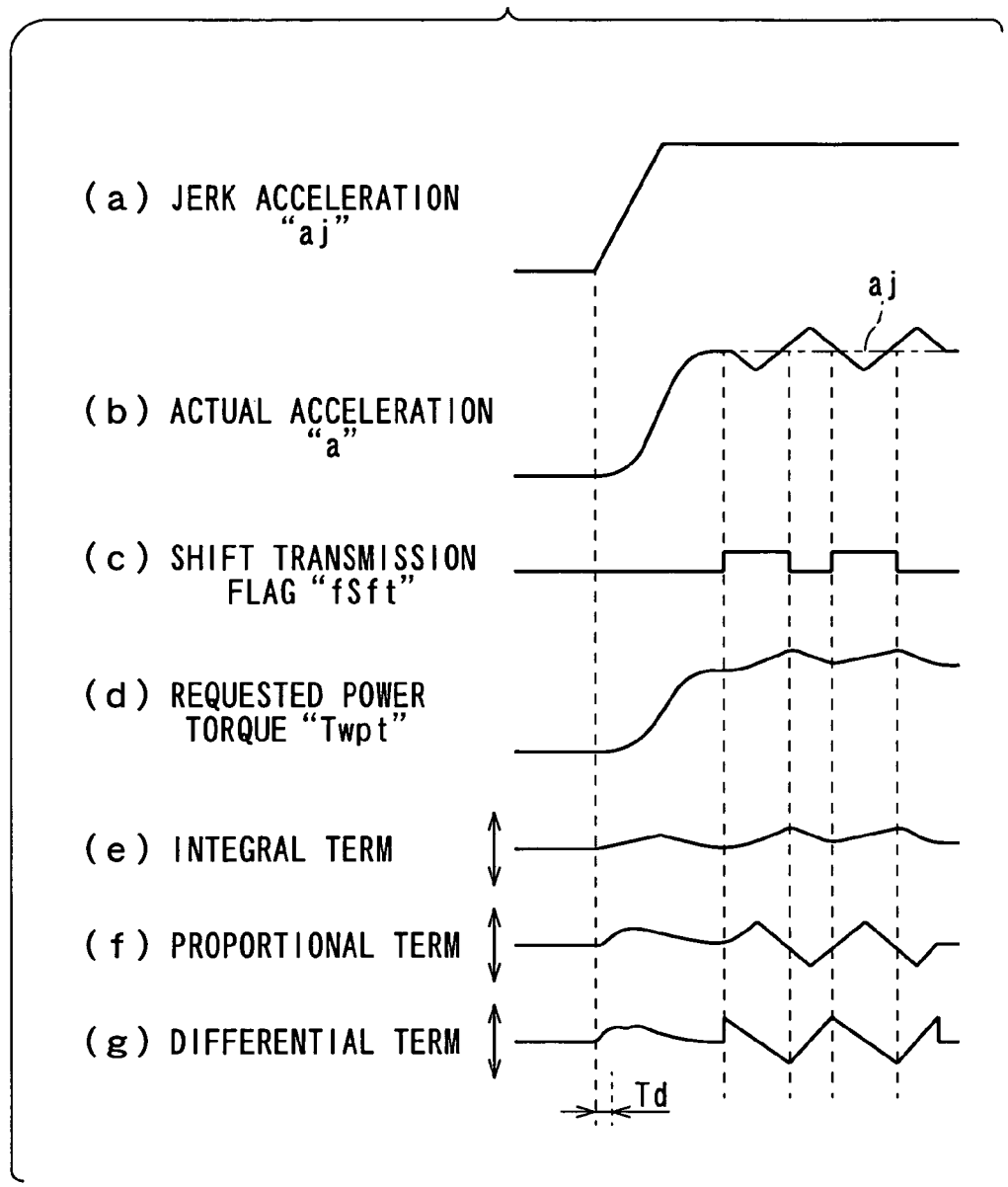
FIG. 11 is a time diagram illustrating the conventional technique, which is shown in comparison with FIG. 10.

On the other hand, FIG. 11 illustrates a case where the feedback manipulated variable "Tfb" is not limited during the previous procedure shown in FIG. 9, i.e. during the gear ratio switchover control. FIG. 11(a)-(g) correspond to FIG. 10(a)-(g), respectively. As shown in the figures, the proportional term, the integral term and the differential term are varied as the actual acceleration "a" that does not involve the gear ratio switchover control becomes slower than the jerk acceleration "aj" (reference acceleration "am"). Thus, with the eventual transmission of the torque of the engine 10 to the side of the drive wheels 16 via the automatic transmission system 14 with the progress of the gear ratio switchover control, large torque is imparted to the drive wheels 16 to resultantly allow the actual acceleration "a" to drastically become faster than the jerk acceleration "aj". Thus, in turn, feedback control will be performed to reduce the actual acceleration "a", so that the actual acceleration "a" becomes slower than the jerk acceleration "aj". In this way, the actual acceleration "a" fluctuates in the vicinity of the jerk acceleration "aj".

According to the present embodiment described above, the following advantages can be obtained.

The feedback manipulated variable "Tfb" has been limited during the gear ratio switchover control of the automatic transmission system 14. Thus, the feedback manipulated variable can be prevented from being excessively deviated from a proper value.

The integral term has been retained during the gear ratio switchover control of the automatic transmission system 14. Thus, a proper manipulated variable can be calculated, by which the actual acceleration can be controlled to a target acceleration (jerk acceleration "aj") immediately after finishing the switchover control.

The proportional term and the differential term have been initialized during the gear ratio switchover control of the automatic transmission system 14. Thus, as the switchover control proceeds, the feedback manipulated variable "Tfb" for enabling transmission of torque of the power train to the drive wheels 16, can be prevented from becoming an excessively improper value depending on the degree of difference between the actual acceleration "a" during the switchover control and the reference acceleration "am".

(Modifications)

The embodiment described may be modified as follows.

In the embodiment described above, the integral term has been retained during the gear ratio switchover control, however, the integral term may be initialized. In this case, the possible difference between the feedforward manipulated variable "Tff" and the torque requested for controlling the actual acceleration to the reference acceleration "am", may not be compensated by the integral term at the time when the torque of the engine is eventually transmitted to the drive wheels 16 with the progress of the gear ratio switchover control. However, the influence caused by this will be small if the accuracy of the feedforward control is very high.

In the embodiment described above, the proportional term and the differential term have been initialized during the gear ratio switchover control, however, only the process of retaining the integral term may be performed, and the operation on the proportional term and the differential term may be continued. In this case as well, as far as a proportional gain and a differential gain are small, the difference in the absolute value of the feedback manipulated variable "Tfb" from a proper value, can be suppressed, which difference will be caused by the proportional term and the differential value at the time when the torque of the engine 10 is eventually transmitted to the drive wheels 16 with the progress of the gear ratio switchover control.

In the gear ratio switchover control, the limiting means for limiting the feedback manipulated variable is not limited to the one for retaining the integral term of the time, or for initializing the proportional term and the integral term. For example, the limiting means may be one for substituting, for fixation, the feedback manipulated variation "Tfb" immediately preceding the gear ratio switchover control, into the integral term, and at the same time for initializing the proportional term and the differential term. Also, for example, a guard process may be applied to the change of the feedback manipulated variable "Tfb" during the gear ratio switchover control.

In the embodiment described above, the reference model has been set based on the response characteristics at the time when the response delay of the actual acceleration is maximized with respect to the step change of the target acceleration. Alternatively, for example, the reference model may be variably set according to the response characteristics for every operating condition of the vehicle. Also, the reference model is not limited to the primary delay mode, but may, for example, be a secondary delay model.

The feedback controller B24 is not limited to the one that performs PID (proportional-integral-differential) control, but may be the one that performs either one of or any two of P control, I control and D control.

The feedforward controller B26 is not limited to the one that performs the processes described above. The feedforward controller B26 may calculate the feedforward manipulated variable "Tff" only from the reference force "Maj"s, for example. Also, the feedforward manipulated variable "Tff" may be calculated using either one of or any two of the air resistance, the road surface resistance and the gravity. However, those parameters which change in the vicinity of the gear ratio switchover control should desirably be added to the feedforward control in order to ensure high accuracy compensation of the error of the feedforward control that follows the gear ratio switchover control, using the integral term before the switchover control. Accordingly, the air resistance, for example, which changes in response to the actual vehicle speed "V" should desirably be added to the feedforward control.

In the embodiment described above, the two-degree freedom control has been performed. Alternatively, for example, only feedback control, such as the PID control, may be performed. In this case, the manipulated variable for controlling the actual acceleration to a target acceleration immediately after finishing the gear ratio switchover control, is considered to be approximated by the integral term immediately preceding the switchover control. Therefore, retaining the integral term is particularly advantageous.

The control used in the above embodiment has been model follow-up control. Alternative to this, the reference model setter B14 may be omitted.

The above embodiment has exemplified the power train having the engine 10, or motive power generation apparatus, and the automatic transmission system 14, which power train has served as means for imparting positive torque to the vehicle (specifically, the drive wheels 16) in performing acceleration control. Alternative to this, for example, an electric motor may be used in place of the motive power generation apparatus.

The above embodiment has exemplified the hydraulic brake actuator, which has served as means for imparting negative torque to the vehicle (specifically, the drive wheels 16) in performing acceleration control. Alternative to this, for example, an electric motor may be used to convert the torque of the wheels (the drive wheels 16 and the idler wheels 18) into electric energy.

The present invention may be embodied in several other forms without departing from the spirit thereof. The embodiments and modifications described so far are therefore intended to be only illustrative and not restrictive, since the scope of the invention is defined by the appended claims rather than by the description preceding them. All changes that fall within the metes and bounds of the claims, or equivalents of such metes and bounds, are therefore intended to be embraced by the claims.

What is claimed is:

1. A control apparatus for controlling anteroposterior acceleration of a vehicle provided with a power train including a motive power generation apparatus and a transmission apparatus that operates on changeable staged gear ratios and a brake actuator for wheels including drive wheels, the rotation force being transmitted to the drive wheels via the transmission apparatus, comprising:
   detecting means for detecting an actual anteroposterior acceleration actually applied to the vehicle;
   feedback manipulated variable calculation means for calculating, at intervals, a feedback manipulated variable necessary for controlling operations of both the motive power generation apparatus and the brake actuators, according to a control that requires calculation of an integral term based on a difference between the actual anteroposterior acceleration and a target acceleration value;
   torque command production means for producing the torque command based on the calculated feedback manipulated variable;
   control means for controlling the operations of both the power train and the brake actuators based on the produced torque command such that the actual value of the anteroposterior acceleration of the vehicle is controlled at the target acceleration value;
   determining means for determining whether or not the transmission apparatus is in a switchover control of the gear ratios; and
   limitation means for temporarily limiting the feedback manipulated variable from being calculated in real time by giving a constant value to the integral term in calculating the feedback manipulated variable when it is determined by the determining means that the transmission apparatus is in the switchover control of the gear ratios.

2. The control apparatus of claim 1, comprising
   feedforward manipulated variable calculation means for
   i) calculating a feedforward manipulated variable necessary for controlling the production of the rotation force of the motive power generation apparatus and
   ii) providing the calculated feedforward manipulated variable to the torque command production means,
   wherein the torque command production means is configured to produce the torque command using both the feedback manipulated variable and the feedforward manipulated variable.

3. The control apparatus of claim 1, wherein
   the control requires calculation of proportional and differential terms based on the difference, in addition to the calculation of the integral term, and
   the limitation means is configured to limit the calculation of the manipulated variable by initializing both the proportional and differential terms to zero.

4. The control apparatus of claim 3, wherein the constant value is an integral value of the difference which was gained just before the switchover control of the gear ratios.

5. The control apparatus of claim 3, wherein the constant value is the feedback manipulated variable which was gained just before the switchover control of the gear ratios.

6. The control apparatus of claim 3, wherein
the control that requires calculation of proportional and differential terms based on the difference, in addition to the calculation of the integral term, and
the limitation means is configured to limit the calculation of the feedback manipulated variable by giving to the integral term an integral value of the difference which was gained just before the switchover control of the gear ratios and by continuing in real time the calculation of the proportional and differential terms based on the difference.

7. The control apparatus of claim 3, further comprising
difference calculation means for calculating a value indicative of difference between the actual acceleration and the target value of the acceleration; and
accumulated value calculation means for calculating an accumulated value of the value indicative of the difference,
wherein the feedback manipulated variable calculation means is configured to calculate the feedback manipulated variable in consideration of the accumulated value, and the limitation means is configured to enable the accumulated value calculation means to store the accumulated value currently calculated by the accumulated value calculation means, when the limitation means limits the calculation of the feedback manipulated variable.

8. The control apparatus of claim 7, further comprising
differential calculation means calculating a value of differential of the value indicative of the difference,
wherein the feedback manipulated variable calculation means is configured to calculate the feedback manipulated variable in consideration of at least one of the value indicative of the difference and the value of the differential, and
the limitation means comprises initialization means for initializing the at least one of the value indicative of the difference and the value of the differential when it is determined by the determining means that the transmission apparatus is in the switchover control of the gear ratios.

9. A control apparatus for controlling anteroposterior acceleration of a vehicle provided with wheels including drive wheels, comprising:
a motive power generation apparatus, mounted on the vehicle, having an output shaft producing a rotation force in response to a torque command to be requested;
a transmission apparatus that operates on changeable staged gear ratios, the rotation force being transmitted to the drive wheels via the transmission apparatus;
a brake actuator for the drive wheels;
detecting means for detecting an actual anteroposterior acceleration actually applied to the vehicle;
feedback manipulated variable calculation means for calculating, at intervals, a feedback manipulated variable necessary for controlling operations of both the motive power generation apparatus and the brake actuators, according to a control that requires calculation of an integral term based on a difference between the actual anteroposterior acceleration and a target acceleration value;
torque command production means for producing the torque command based on the calculated feedback manipulated variable;
control means for controlling the operations of both the power train and the brake actuators based on the produced torque command such that the actual value of the anteroposterior acceleration of the vehicle is controlled at the target acceleration value;
determining means for determining whether or not the transmission apparatus is in a switchover control of the gear ratios; and
limitation means for temporarily limiting the feedback manipulated variable from being calculated in real time by giving a constant value to the integral term in calculating the feedback manipulated variable when it is determined by the determining means that the transmission apparatus is in the switchover control of the gear ratios.

10. The control apparatus of claim 9, comprising
feedforward manipulated variable calculation means for
i) calculating a feedforward manipulated variable necessary for controlling the production of the rotation force of the motive power generation apparatus and
ii) providing the calculated feedforward manipulated variable to the torque command production means,
wherein the torque command production means is configured to produce the torque command using both the feedback manipulated variable and the feedforward manipulated variable.

11. The control apparatus of claim 9, wherein
the control requires calculation of proportional and differential terms based on the difference, in addition to the calculation of the integral term, and
the limitation means is configured to limit the calculation of the feedback manipulated variable by initializing both the proportional and differential terms to zero.

12. The control apparatus of claim 11, wherein the constant value is an integral value of the difference which was gained just before the switchover control of the gear ratios.

13. The control apparatus of claim 11, wherein the constant value is the feedback manipulated variable which was gained just before the switchover control of the gear ratios.

14. The control apparatus of claim 11, wherein
the control that requires calculation of proportional and differential terms based on the difference, in addition to the calculation of the integral term, and
the limitation means is configured to limit the calculation of the feedback manipulated variable by giving to the integral term an integral value of the difference which was gained just before the switchover control of the gear ratios and by continuing in real time the calculation of the proportional and differential terms based on the difference.

15. The control apparatus of claim 11, further comprising
difference calculation means for calculating a value indicative of difference between the actual acceleration and the target value of the acceleration; and
accumulated value calculation means for calculating an accumulated value of the value indicative of the difference,
wherein the feedback manipulated variable calculation means is configured to calculate the feedback manipulated variable in consideration of the accumulated value, and the limitation means is configured to enable the accumulated value calculation means to store the accumulated value currently calculated by the accumulated value calculation means, when the limitation means limits the calculation of the feedback manipulated variable.

16. The control apparatus of claim 15, further comprising
differential calculation means calculating a value of differential of the value indicative of the difference,
wherein the feedback manipulated variable calculation means is configured to calculate the feedback manipulated variable in consideration of at least one of the value indicative of the difference and the value of the differential, and the limitation means comprises initialization means for initializing the at least one of the value indicative of the difference and the value of the differential when it is determined by the determining means that the transmission apparatus is in the switchover control of the gear ratios.

* * * * *